Nov. 20, 1962  J. G. BILLMEYER  3,064,769
FASTENER CONSTRUCTION AND PROCESSES OF
MOUNTING METAL-CERAMIC COMPOSITIONS
Filed April 7, 1958  3 Sheets-Sheet 3
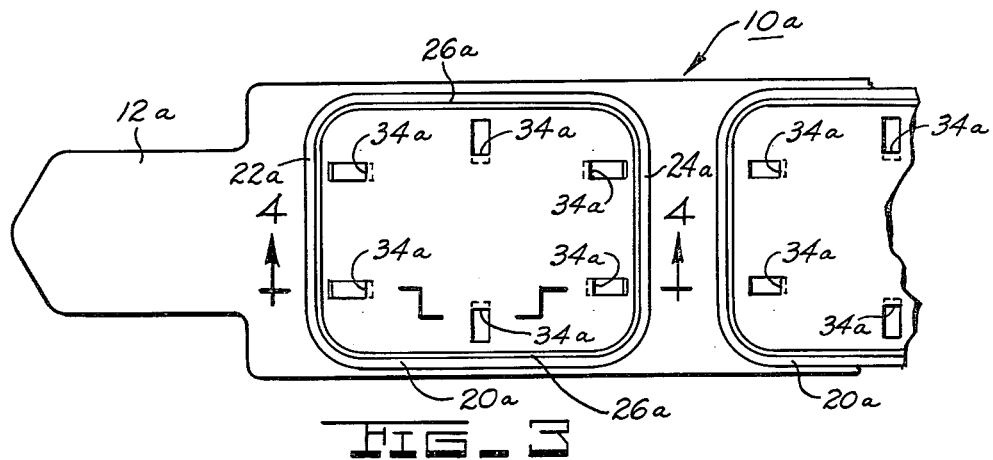
FIG_3
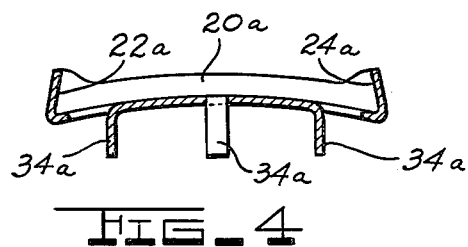
FIG_4
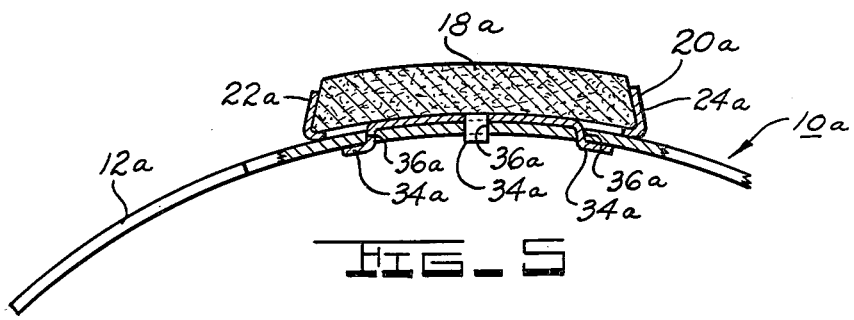
FIG_5
INVENTOR.
JAMES G. BILLMEYER
BY
John A. Young
ATTORNEY.

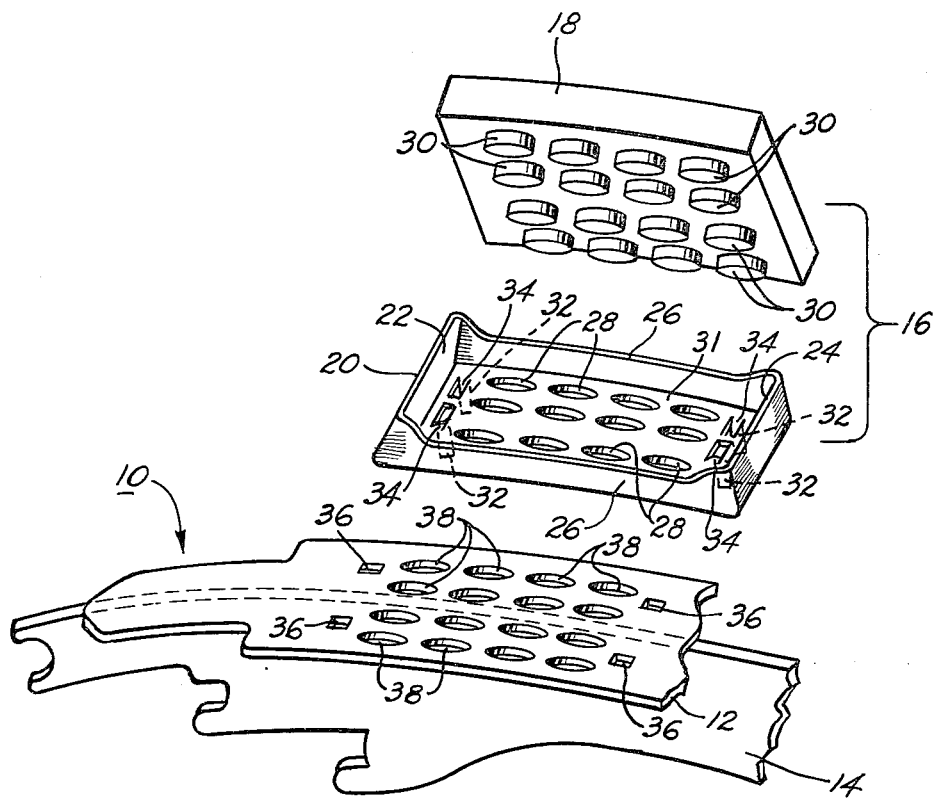
FIG_1

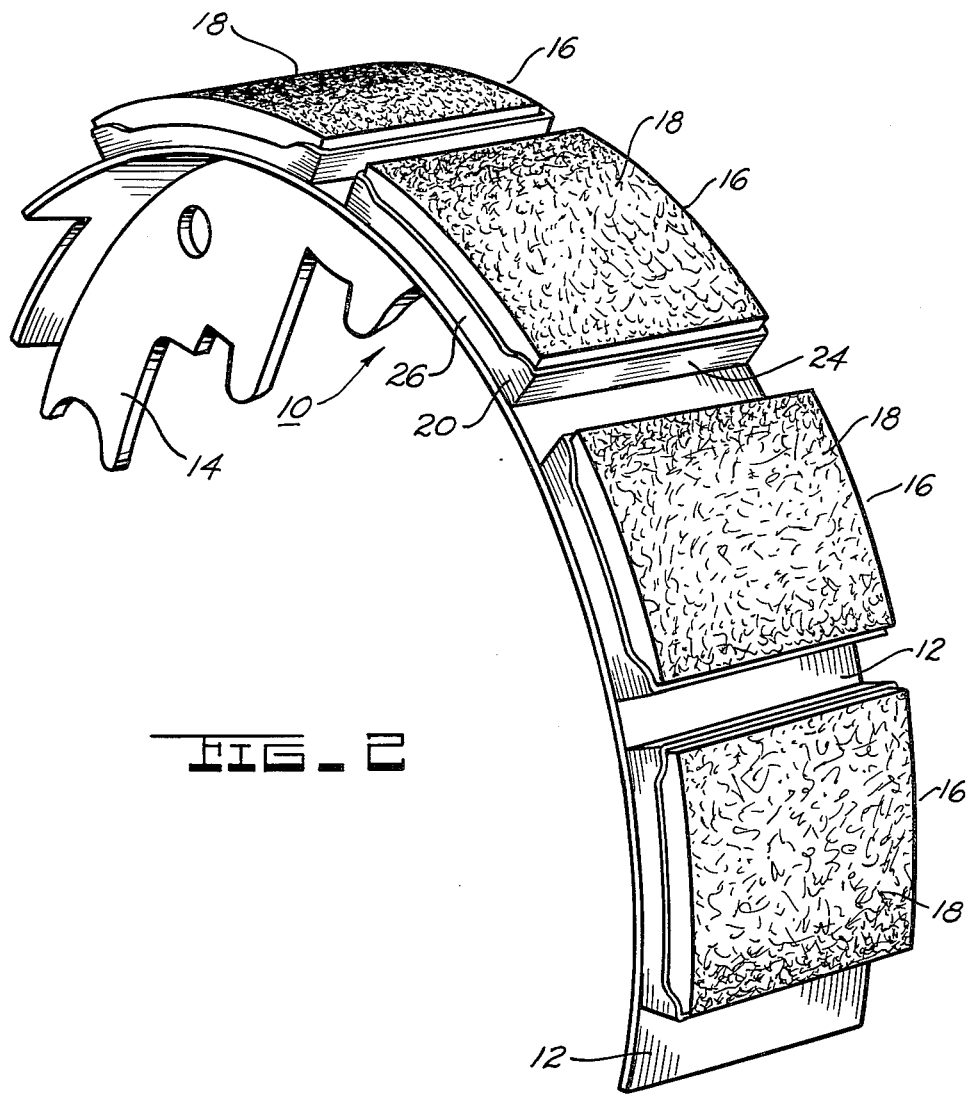
FIG_2

United States Patent Office 3,064,769
Patented Nov. 20, 1962

3,064,769
FASTENER CONSTRUCTION AND PROCESSES OF MOUNTING METAL-CERAMIC COMPOSITIONS
James G. Billmeyer, South Bend, Ind., assignor to The Bendix Corporation, a corporation of Delaware
Filed Apr. 7, 1958, Ser. No. 726,716
2 Claims. (Cl. 188—250)

This invention relates to various mounting constructions which are used for positioning metal-ceramic friction compositions, and various processes which can be used for obtaining such mountings.

Metal-ceramic friction compositions of the general class disclosed and claimed in U.S. Patent No. 2,784,105, and in copending applications, Nos. 602,480 (filed July 20, 1956), now abandoned, and 688,917 (continuation in part, filed October 8, 1957), now Patent No. 2,948,955, are very useful in high kinetic energy absorbing applications.

In recent years, greater stress has been placed on automotive brakes owing to the higher vehicle speeds, heavier vehicle weight, smaller diameter wheels, etc. and as a result, automotive braking conditions are approaching some of the high temperature conditions which prevail during braking in aircraft installations. As a result, automotive brake designers are desirous of applying metal-ceramic friction compositions to the field of automotive braking. The metal-ceramic compositions would replace the so-called "organic" friction compositions comprising resin binder, asbestos base, fillers, etc.

In contrast with the "organic" friction compositions, the metal-ceramic friction compositions require external or lateral support because of their great brittleness and low impact resistance. Also, the friction article once it is sintered is relatively inelastic and any forming must be done by compacting the ingredients to a desired preliminary configuration before the sintering step. For these reasons, the metal-ceramic friction composition must be processed, and mounted on the brake shoe quite differently from the organic friction material.

It is one of the principal objects of the present invention to make available a mounting structure for the metal-ceramic class of friction materials which will in no way interfere with the functioning of the friction composition, and which will lend the necessary external support to the friction composition to prevent its fracturing or crumbling during use under the braking action. Certain side loading as well as normal loading of the friction composition is inevitable when the friction composition is brought into engagement with the opposing, relatively rotatable surface. Tangential and normal braking forces tend to cause the edges of the friction composition to crumble, unless the necessary external support is provided.

Another purpose of this invention is to achieve a mounting structure which will enable the friction surface to come into conformable contact with the opposing surface, and will also provide uniform support at the undersurface of the friction composition so as to avoid any strain on the friction composition which could produce buckling and cracking.

It is also a part of this invention that the mounting structure enables a complete utilization of the friction composition so that the lining can be worn down to its last remnant and there is no substantial loss of efficiency in holding the composition in place as a function of lining wear.

Along with these foregoing objects and features of the invention, it is intended that the mounting structure shall be constructible at a low cost and can be used with any of the acceptable metal-ceramic friction compositions.

Other objects and features of the invention will become apparent from the consideration of the following description, which proceeds with reference to the accompanying drawings, in which:

FIGURE 1 is an exploded view of the mounting arrangement, showing an arcuate shoe, container, and friction material compact;

FIGURE 2 is an isometric view of an arcuate brake shoe showing a number of spaced friction segments which are secured to the shoe;

FIGURE 3 is a top view of a second embodiment of the invention showing a different mounting arrangement, the friction material being removed from the container for clarification;

FIGURE 4 is a section view taken on line 4—4 of FIGURE 3; and

FIGURE 5 is a section view taken through the container illustrated in FIGURE 3 as it appears with lining after attachment to the shoe.

Referring first to the embodiment shown in FIGURES 1 and 2, the supporting structure for the friction articles is an arcuate brake shoe, which is of a conventional construction and which is indicated generally by reference numeral 10. Millions of such shoes have been constructed for use in the automotive braking field.

The shoe consists typically of an arcuate rim 12, sometimes referred to as a "table," and a transverse strengthening web 14 (FIGURE 2) which is welded to the rim to impart a strengthening or stiffening effect thereto. Thus, the rim 12 becomes relatively inflexible and is thereby capable of withstanding the normal force of engagement of the shoe against an opposing, relatively rotatable drum surface (not shown). At spaced intervals along the length of the rim 12 there is fastened friction articles, designated by reference numeral 16. Each article consists of a powdered metal-ceramic friction composition 18 which is compacted into a shallow cup 20. The inwardly tapering sides 22 and 24 at the leading and trailing ends of the cup serve to lock the friction composition within the cup. Sides 26 of the cup may be cut down to reduce scoring effect on the opposing drum surface.

Referring to the consistency of the composition 18, the binder ingredient originates as loose mass of metal powder which surrounds a discontinuous phase of ceramic particles, the metal particles becoming coalesced during sintering of the friction article.

Prior to attachment of the cup 20 to the shoe, the cup is first filled with the powder friction composition mixture which is then compacted therein. A number of holes 28 in the base 31 of the cup permit portions of the friction material to pass therethrough. The die (not shown) which is used for compacting the powder, forms portions of the composition into dowels 30 which extend within openings 28.

The combination of friction material 18 and cup 20 is next heat-treated to sinter the metal powders into continuous metallic phase of the friction composition, and following sintering, the article is coined or re-pressurized, during which time the walls 22 and 24 are formed inwardly and the friction composition 18 is densified to remove any porosity that occurs during sintering.

The article is now ready for mounting on the brake shoe 10. At the base 31 of the container 20, there are lanced portions 34 which form tabs 32 that are bendable away from the base 31 of the container after the friction composition has been secured therein. The tabs 32, when bent downwardly, are passed through slits 36 in the shoe rim and then clinched over to hold the cup 20 against the rim of the shoe. The dowels 30 of friction material match with openings 38 in the rim 12 of the shoe and fit therein, thus providing additional resistance to movement of the friction article relative to the brake shoe under braking stress. Since the dowels 30 of friction material 18 fill the openings 28 and 38 in the cup and rim, respectively, neither the cup nor the shoe are appreciably weakened by so aperturing these parts.

Because all of the braking forces are transmitted through the mounting structure of the friction lining, it is most important to provide a sufficient shear resistance between the lining 18 and shoe 10. The principal part of this resisting force is provided by the dowels 30 which fit through openings 28 of the cup and into the openings 38 of the shoe rim 12. While some of the torque-resisting force is absorbed by the tabs 32, their principal function is to hold the friction article tightly against the rim 12 of the brake shoe.

The cup 20 is concavo-convexly curved so that it will conform with the external or supporting surface of the rim 12. If the container is not backed solidly, then the cup and its contained friction material will be caused to bend under drum engagement, and this can crack the friction composition because of its inflexibility. The tabs 32 pull the container 20 tightly against the rim 12 and hold it in a conforming position, preventing any lifting away from the shoe.

Because the container is approximately rectangularly shaped, with an anchoring tab at each of the four corners thereof, the friction article is held fast against the shoe and cannot move from its appointed position.

Referring next to the embodiment shown in FIGURES 3, 4, and 5, it will be seen that doweling of the friction material to the shoe can be eliminated, if proper provision is made for resisting the tangential braking stresses through a number of tab connections. As shown in FIGURE 3, a total of six such tab connections designated by reference numeral 34a are provided, two at each of the leading and trailing ends 22a and 24a of the container 20a and one at each of the opposite sides 26a, adjacent the edges of the rim 12a. As in the previous embodiment, the tabs 34a, (FIGURE 4) are formed from struck portions of the container 20a and are bent downwardly to pass through companion slits 36a of the shoe rim 12a. Once these tabs 34a are matched and passed through the slits 36a and are clinched over as shown in FIGURE 5, the container 20a becomes firmly fixed in place and is held against movement radially away from the shoe, and is further locked against lateral and lengthwise movement with respect to the shoe 10a.

In this embodiment, the total braking force must be resisted by the tabs 34a and their connection with the shoe rim 12a. A greater number of tabs in this instance lends greater shoe resistance and insures the proper resistance capacity.

While this invention has been described in conjunction with but two selected example embodiments thereof, it will be apparent to those skilled in the art, that numerous revisions and adaptations of the invention are possible without departing from the underlying principles thereof. It is intended, therefore, that such revisions and adaptations of the invention, as are reasonably to be expected on the part of those skilled in the art, and which incorporate the herein disclosed principles, will be included within the scope of the following claims.

I claim:

1. A mounting construction for friction compositions that include a sintered metal, said mounting construction comprising: a concavo-convexly curved container for receiving said composition and having inwardly tapering sides which provide lateral support for the friction composition, a plurality of bendable tabs secured to the container at the base thereof, said container having a plurality of spaced openings at the base thereof and having a friction compact therein comprising a sintered metal material that includes projections which extend through and fill said spaced openings of said container, and an arcuate shoe support which has slots for receiving said tabs and openings to receive said projections of said compact, said tabs being bent over to clinch the container to said shoe rim, and said projections tightly fitting into said openings in said shoe to provide dowelled connections between said sintered metal material and supporting shoe to resist longitudinal movement therebetween.

2. The structure of claim 1 in which said tabs are formed by striking a portion from the base of said container, said container being essentially rectangular in outline and having a tab formed at each of the four corners thereof.

References Cited in the file of this patent

UNITED STATES PATENTS

| 1,660,135 | Price | Feb. 21, 1928 |
| 1,771,594 | Thompson | July 29, 1930 |
| 1,771,595 | Thompson | July 29, 1930 |
| 1,907,490 | Brackett | May 9, 1933 |
| 1,956,462 | Knuth | Apr. 24, 1934 |
| 2,218,615 | McCune | Oct. 22, 1940 |
| 2,476,151 | Jeune | July 12, 1949 |
| 2,784,105 | Stedman et al. | Mar. 5, 1957 |
| 2,791,300 | Bonkowski | May 7, 1957 |
| 2,824,629 | Wellman | Feb. 25, 1958 |

FOREIGN PATENTS

| 443,320 | Great Britain | Feb. 26, 1936 |